(12) United States Patent
Ise

(10) Patent No.: US 8,736,717 B2
(45) Date of Patent: May 27, 2014

(54) IMAGE PICKUP APPARATUS AND CONTROL METHOD THEREFOR

(75) Inventor: Makoto Ise, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 415 days.

(21) Appl. No.: 13/151,797

(22) Filed: Jun. 2, 2011

(65) Prior Publication Data

US 2011/0317039 A1    Dec. 29, 2011

(30) Foreign Application Priority Data

Jun. 29, 2010   (JP) ................................. 2010-147605

(51) Int. Cl.
*H04N 5/262*    (2006.01)

(52) U.S. Cl.
USPC ..................................... 348/240.2; 348/222.1

(58) Field of Classification Search
USPC ........................................... 348/222.1, 240.2
See application file for complete search history.

(56) References Cited

FOREIGN PATENT DOCUMENTS

| JP | 63-023486 A | 1/1988 |
|---|---|---|
| JP | 05-048460 | 2/1993 |
| JP | 07-212770 A | 8/1995 |
| JP | 2005-333316 | 12/2005 |
| JP | 2008-098810 A | 4/2008 |
| JP | 2010-118876 A | 5/2010 |
| JP | 2010-128159 A | 6/2010 |

OTHER PUBLICATIONS

The above references were in a Jan. 21, 2014 Japanese Office Action, which is enclosed without an English Translation, that issued in Japanese Patent Application No. 2010-147605.

*Primary Examiner* — Usman Khan

(74) *Attorney, Agent, or Firm* — Cowan, Liebowitz & Latman, P.C.

(57) ABSTRACT

An image pickup apparatus capable of improving a conversion speed of column parallel A/D converters, while preventing a gradation representation of image pickup signals from becoming rough. The image pickup apparatus includes a CMOS sensor having A/D converters provided on output sides of column amplifiers for respective columns of two-dimensionally arranged pixels. The A/D converters have a first operation mode in which they operate with a first number of conversion bits and at a first conversion speed and a second operation mode in which they operate with a second number of conversion bits and at a second conversion speed. A signal processing circuit adds together plural pieces of two-dimensionally arranged pixel data output from the A/D converter that operate in the second operation mode, thereby expanding the number of gradation bits of the pixel data from the second number of conversion bits.

15 Claims, 19 Drawing Sheets

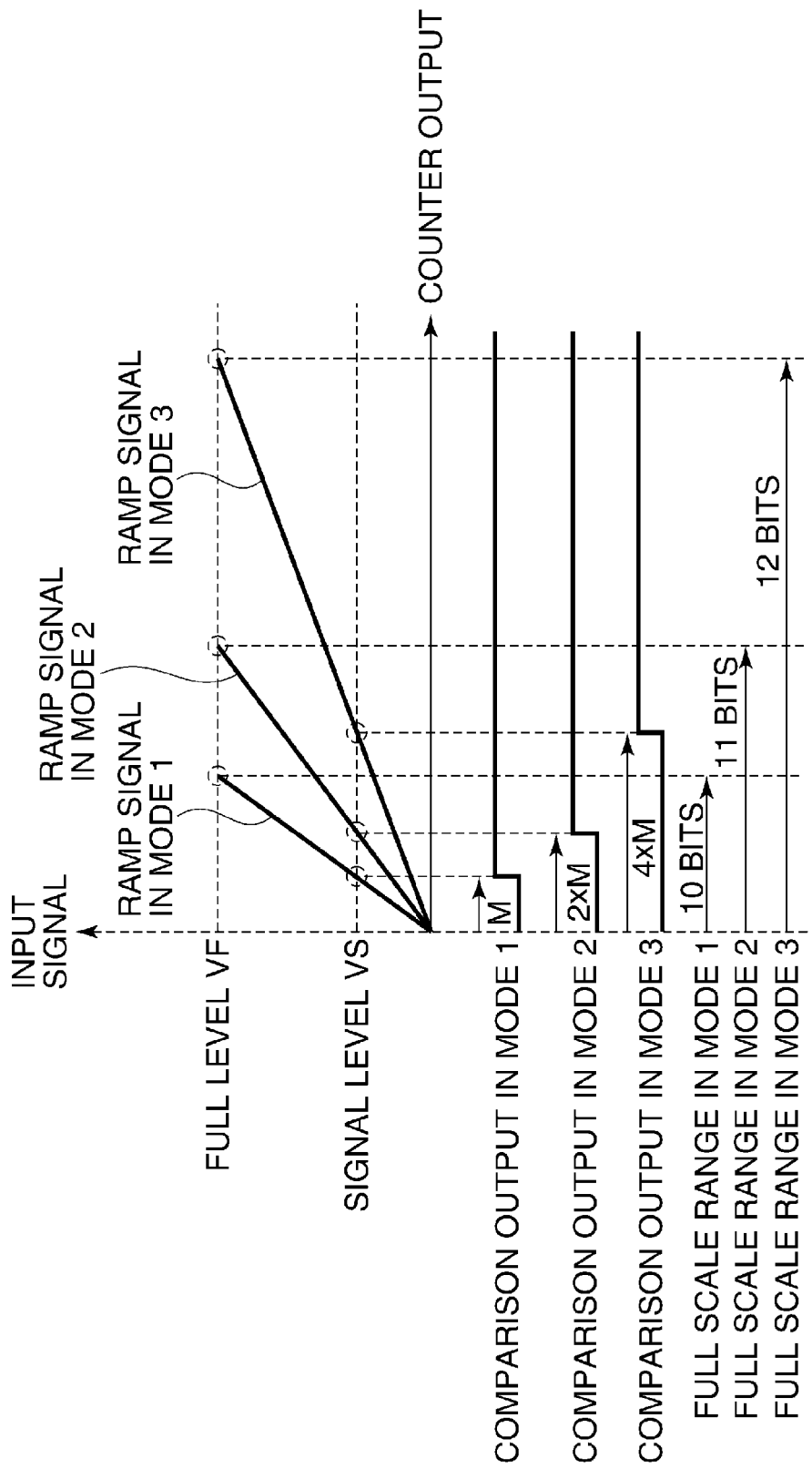

FIG.9E

| PIXEL INTERPOLATION ARITHMETIC FORMULA | ARITHMETIC CONTENT | NUMBER OF GRADATION BITS IN MODE 3 | NUMBER OF GRADATION BITS IN MODE 1 |
|---|---|---|---|
| R11 | WITHOUT CHANGE | 12 | 10 |
| R12=(R11+R13)/2 | 2-PIXEL INTERPOLATION | 13 | 11 |
| R13 | WITHOUT CHANGE | 12 | 10 |
| R14=(R13+R15)/2 | 2-PIXEL INTERPOLATION | 13 | 11 |
| R21=(R11+R31)/2 | 2-PIXEL INTERPOLATION | 13 | 11 |
| R22=(R11+R13+ R31+R33)/4 | 4-PIXEL INTERPOLATION | 14 | 12 |
| R23=(R13+R33)/2 | 2-PIXEL INTERPOLATION | 13 | 11 |
| R24=(R13+R15+ R33+R35)/4 | 4-PIXEL INTERPOLATION | 13 | 12 |
| R31 | WITHOUT CHANGE | 12 | 10 |
| R32=(R13+R33)/2 | 2-PIXEL INTERPOLATION | 13 | 11 |
| R33 | WITHOUT CHANGE | 12 | 10 |
| R34=(R33+R35)/2 | 2-PIXEL INTERPOLATION | 13 | 11 |
| R41=(R31+R51)/2 | 2-PIXEL INTERPOLATION | 13 | 11 |
| R42=(R31+R33+ R51+R53)/4 | 4-PIXEL INTERPOLATION | 14 | 12 |
| R43=(R33+R53)/2 | 2-PIXEL INTERPOLATION | 13 | 11 |
| R44=(R33+R35+ R53+R55)/4 | 4-PIXEL INTERPOLATION | 14 | 12 |

FIG.9F

| PIXEL INTERPOLATION ARITHMETIC FORMULA | ARITHMETIC CONTENT | NUMBER OF GRADATION BITS IN MODE 3 | NUMBER OF GRADATION BITS IN MODE 1 |
|---|---|---|---|
| G11=(G01+G10+ G12+G21)/4 | 4-PIXEL INTERPOLATION | 14 | 12 |
| G12 | WITHOUT CHANGE | 12 | 10 |
| G13=(G03+G12+ G14+G23)/4 | 4-PIXEL INTERPOLATION | 14 | 12 |
| G14 | WITHOUT CHANGE | 12 | 10 |
| G21 | WITHOUT CHANGE | 12 | 10 |
| G22=(G12+G21+ G23+G32)/4 | 4-PIXEL INTERPOLATION | 14 | 12 |
| G23 | WITHOUT CHANGE | 12 | 10 |
| G24=(G14+G23+ G25+G34)/4 | 4-PIXEL INTERPOLATION | 14 | 12 |
| G31=(G21+G30+ G32+G41)/4 | 4-PIXEL INTERPOLATION | 14 | 12 |
| G32 | WITHOUT CHANGE | 12 | 10 |
| G33=(G23+G32+ G34+G43)/4 | 4-PIXEL INTERPOLATION | 14 | 12 |
| G34 | WITHOUT CHANGE | 12 | 10 |
| G41 | WITHOUT CHANGE | 12 | 10 |
| G42=(G32+G41+ G43+G52)/4 | 4-PIXEL INTERPOLATION | 14 | 12 |
| G43 | WITHOUT CHANGE | 12 | 10 |
| G44=(G34+G43+ G45+G54)/4 | 4-PIXEL INTERPOLATION | 14 | 12 |

FIG.9G

| PIXEL INTERPOLATION ARITHMETIC FORMULA | ARITHMETIC CONTENT | NUMBER OF GRADATION BITS IN MODE 3 | NUMBER OF GRADATION BITS IN MODE 1 |
|---|---|---|---|
| B11=(B00+B02+ B20+B22)/4 | 4-PIXEL INTERPOLATION | 14 | 12 |
| B12=(B02+B22)/2 | 2-PIXEL INTERPOLATION | 13 | 11 |
| B13=(B02+B04+ B22+B24)/4 | 4-PIXEL INTERPOLATION | 14 | 12 |
| B14=(B04+B24)/2 | 2-PIXEL INTERPOLATION | 13 | 11 |
| B21=(B20+B22)/2 | 2-PIXEL INTERPOLATION | 13 | 11 |
| B22 | WITHOUT CHANGE | 12 | 10 |
| B23=(B22+B24)/2 | 2-PIXEL INTERPOLATION | 13 | 11 |
| B24 | WITHOUT CHANGE | 12 | 10 |
| B31=(B20+B22+ B40+B42)/4 | 4-PIXEL INTERPOLATION | 14 | 12 |
| B32=(B22+B42)/2 | 2-PIXEL INTERPOLATION | 13 | 11 |
| B33=(B22+B24+ B42+B44)/4 | 4-PIXEL INTERPOLATION | 14 | 12 |
| B34=(B24+B44)/2 | 2-PIXEL INTERPOLATION | 13 | 11 |
| B41=(B40+B42)/2 | 2-PIXEL INTERPOLATION | 13 | 11 |
| B42 | WITHOUT CHANGE | 12 | 10 |
| B43=(B42+B44)/2 | 2-PIXEL INTERPOLATION | 13 | 11 |
| B44 | WITHOUT CHANGE | 12 | 10 |

*FIG.10*

| ISO SENSITIVITY | COLUMN AMPLIFIER GAIN | MULTIPLIER | TOTAL GAIN | NUMBER OF GRADATION BITS IN MODE 3 |
|---|---|---|---|---|
| 100 | 1-FOLD | 1-FOLD | 1-FOLD | 12 |
| 200 | 2-FOLD | 1-FOLD | 2-FOLD | 12 |
| 400 | 4-FOLD | 1-FOLD | 4-FOLD | 12 |
| 800 | 8-FOLD | 1-FOLD | 8-FOLD | 12 |
| 1600 | 8-FOLD | 2-FOLD | 16-FOLD | 11 |
| 3200 | 8-FOLD | 4-FOLD | 32-FOLD | 10 |
| 6400 | 8-FOLD | 8-FOLD | 64-FOLD | 9 |

*FIG.11D*

| PIXEL INTERPOLATION ARITHMETIC FORMULA | ARITHMETIC CONTENT | NUMBER OF GRADATION BITS IN MODE 1 |
|---|---|---|
| R11'=(R11+R12+ R21+R22)/4 | 4-PIXEL INTERPOLATION | 12 |
| R13'=(R13+R14+ R23+R24)/4 | 4-PIXEL INTERPOLATION | 12 |
| R31'=(R31+R32+ R41+R42)/4 | 4-PIXEL INTERPOLATION | 12 |
| R33'=(R33+R34+ R43+R44)/4 | 4-PIXEL INTERPOLATION | 12 |

*FIG.11E*

| PIXEL INTERPOLATION ARITHMETIC FORMULA | ARITHMETIC CONTENT | NUMBER OF GRADATION BITS IN MODE 1 |
|---|---|---|
| G11'=(G11+G12+ G21+G22)/4 | 4-PIXEL INTERPOLATION | 12 |
| G13'=(G13+G14+ G23+G24)/4 | 4-PIXEL INTERPOLATION | 12 |
| G31'=(G31+G32+ G41+G42)/4 | 4-PIXEL INTERPOLATION | 12 |
| G33'=(G33+G34+ G43+G44)/4 | 4-PIXEL INTERPOLATION | 12 |

*FIG.11F*

| PIXEL INTERPOLATION ARITHMETIC FORMULA | ARITHMETIC CONTENT | NUMBER OF GRADATION BITS IN MODE 1 |
|---|---|---|
| B11'=(B11+B12+ B21+B22)/4 | 4-PIXEL INTERPOLATION | 12 |
| B13'=(B13+B14+ B23+B24)/4 | 4-PIXEL INTERPOLATION | 12 |
| B31'=(B31+B32+ B41+B42)/4 | 4-PIXEL INTERPOLATION | 12 |
| B33'=(B33+B34+ B43+B44)/4 | 4-PIXEL INTERPOLATION | 12 |

*FIG.12*

| ISO SENSITIVITY | COLUMN AMPLIFIER GAIN | MULTIPLIER | TOTAL GAIN | NUMBER OF GRADATION BITS IN MODE 1 |
|---|---|---|---|---|
| 100 | 1-FOLD | 1-FOLD | 1-FOLD | 12 |
| 200 | 1-FOLD | 2-FOLD | 2-FOLD | 11 |
| 400 | 1-FOLD | 4-FOLD | 4-FOLD | 10 |
| 800 | 1-FOLD | 8-FOLD | 8-FOLD | 9 | form
IMAGE PICKUP APPARATUS AND CONTROL METHOD THEREFOR

BACKGROUND OF THE INVENTION

1. Field of the Invention

The present invention relates to an image pickup apparatus having an image pickup device and a control method therefor, and more particular, to an image pickup apparatus having a solid-state image pickup device with A/D converters, such as a complementary metal oxide semiconductor image sensor (hereinafter, referred to as the CMOS sensor), and a control method therefor.

2. Description of the Related Art

With integration of a CMOS logic process and an image sensor process, it becomes possible to mount analog circuits, digital circuits, signal processors, etc. onto a chip of a solid-state image pickup device such as a CMOS sensor. For example, a CMOS sensor has already come into practical use that has an image sensor chip on which pixels are two-dimensionally arranged and A/D converters are mounted.

In a CMOS sensor of this type, a column parallel A/D conversion architecture is used, in which A/D converters are each provided for a corresponding one of columns of two-dimensionally arranged pixels, whereby a conversion rate in each A/D converter can be lowered from a pixel readout rate to a line readout rate. This is advantageous in that the entire power consumption can be reduced and the readout rate of the CMOS sensor can easily be increased.

As the CMOS sensor using the column parallel A/D conversion architecture, a CMOS sensor using so-called ramp type A/D converters with triangle-wave sweep has been known (see, for example, Japanese Laid-open Patent Publication No. H5-48460).

In this CMOS sensor, analog values input from analog value input terminals are stored into an analog value storage unit, and these analog values are input to respective one input terminals of comparators, whereas reference values from D/A converters gradually increasing with a counter operation are input to respective other input terminals of the comparators. When each of the analog values becomes smaller than the corresponding reference value, counter data is stored into a digital value storage unit. Subsequently, pieces of counter data are read as digital values in sequence from the digital value storage unit by a scanning circuit.

As previously described, the reference values (i.e., triangle waves) are applied to the comparators of the CMOS sensor. In a case, for example, that the CMOS sensor is mounted with 8-bit A/D counters, a time period for performing 256-step processing (where 256 is 2 raised to the eighth power) is required to sweep the triangle wave so as to change the voltage of the triangle wave in synchronism with a counter operation.

The triangle wave is supplied in the form of analog voltage, and a time period required for the triangle wave to be stabilized is determined according to an RC time constant. It is therefore difficult in principle to shorten each step processing time to less than the time period required for the triangle wave to be stabilized.

In other words, the number of steps required to sweep the triangle wave increases with increase in the number of bits used in the A/D converters, which makes it difficult to increase the processing speed. With the CMOS sensor using ramp type A/D converters, it is therefore difficult to simultaneously satisfy the demand for increasing the number of bits of the A/D converters and the demand for increasing the processing speed.

Some of CMOS sensors using the column parallel A/D conversion architecture is configured to operate an n-bit counter in a mode for performing $2^n$-step counting to increase the number of bits of a ramp type A/D converter, or in a mode for counting of a less number of steps to increase the processing speed, while reducing the number of bits to less than n (see, for example, Japanese Laid-open Patent Publication No. 2005-333316). With this CMOS sensor, by selectively using one of these two operation modes, an object moving at a high speed can be photographed, and a photograph with smooth gradations can be taken.

With this CMOS sensor, however, in order to increase the processing speed, the number of bits must be reduced, so that the gradation representation becomes rough. In other words, even if either the operation mode attaching importance to the increase of the number of bits or the operation mode attaching importance to the increase of processing speed can be selected, it is difficult to simultaneously satisfy the demand for increasing the number of bits and the demand for increasing the processing speed.

SUMMARY OF THE INVENTION

The present invention provides an image pickup apparatus and a control method therefor, which are capable of substantially improving an A/D conversion speed, while preventing a gradation representation of an image pickup signal from becoming rough.

According to a first aspect of this invention, there is provided an image pickup apparatus, which comprises pixels two-dimensionally arranged and each having a photoelectric conversion element, column amplifiers for respective columns of the pixels, A/D converters disposed on output sides of the column amplifiers and having a first operation mode in which the A/D converters operate with a first number of conversion bits and at a first conversion speed and a second operation mode in which the A/D converters operate with a second number of conversion bits less than the first number of conversion bits and at a second conversion speed faster than the first conversion speed, and an expansion processing unit configured to add together plural pieces of two-dimensionally arranged pixel data which are output from the A/D converters that operate in the second operation mode, to thereby expand a number of gradation bits of the pixel data from the second number of conversion bits.

According to a second aspect of this invention, there is provided a control method for the image pickup apparatus described in the first aspect.

With this invention, the number of gradation bits can be expanded by adding together the plural pieces of pixel data output from the A/D converter, whereby the A/D conversion speed can be improved, while preventing the gradation representation of image data (image pickup signal) from becoming rough in the operation mode attaching importance to the increase of processing speed.

Further features of the present invention will become apparent from the following description of exemplary embodiments with reference to the attached drawings.

BRIEF DESCRIPTION OF THE DRAWINGS

FIG. 7 is a view showing an example operation of a ramp type A/D converter of the CMOS sensor;

FIG. 8A shows a pixel data array of 12-bit length (in binary) having a 10-bit integer part and a 2-bit fractional part, FIG. 8B shows a process for 2-pixel interpolation where two pieces of pixel data A, B are added together and then divided by 2, and FIG. 8C shows a process for 4-pixel interpolation where four pieces of pixel data A to D are added together and then divided by 4;

FIGS. 9E to 9G are view showing contents of arithmetic processing for respective pixel data and the number of gradation bits of pixel data expanded by the arithmetic processing;

FIG. 10 is a view showing a gain switching table in which a relation is shown among ISO sensitivity, gains, and the number of gradation bits at the time of still image photographing;

FIGS. 11A to 11F are views showing a reduction zooming process performed by the signal processing circuit shown in FIG. 1 for size conversion to a moving image size, where FIGS. 11A to 11C show arrangements of red (R), green (G), and blue (B) color pixels after the reduction zooming, and FIGS. 11D to 11E show interpolation formulae for the reduction zooming;

FIG. 12 is a view showing a gain switching table in which a relation is shown among ISO sensitivity, gains, and the number of gradation bits at the time of moving image photographing;

FIG. 13A shows example timings of accumulation of optical charges generated by preliminary strobe light emission onto an EF evaluation block region, and FIG. 13B shows a change in light intensity with lapse of time; FIGS. 14A and 14B show a case where an optical charge readout period in the CMOS sensor is longer than the accumulation period, and FIGS. 14C and 14D show a case where the optical charge readout period is shorter than the accumulation period.

DESCRIPTION OF THE EMBODIMENTS

The present invention will now be described in detail below with reference to the drawings showing preferred embodiments thereof.

First Embodiment

Figure 1:
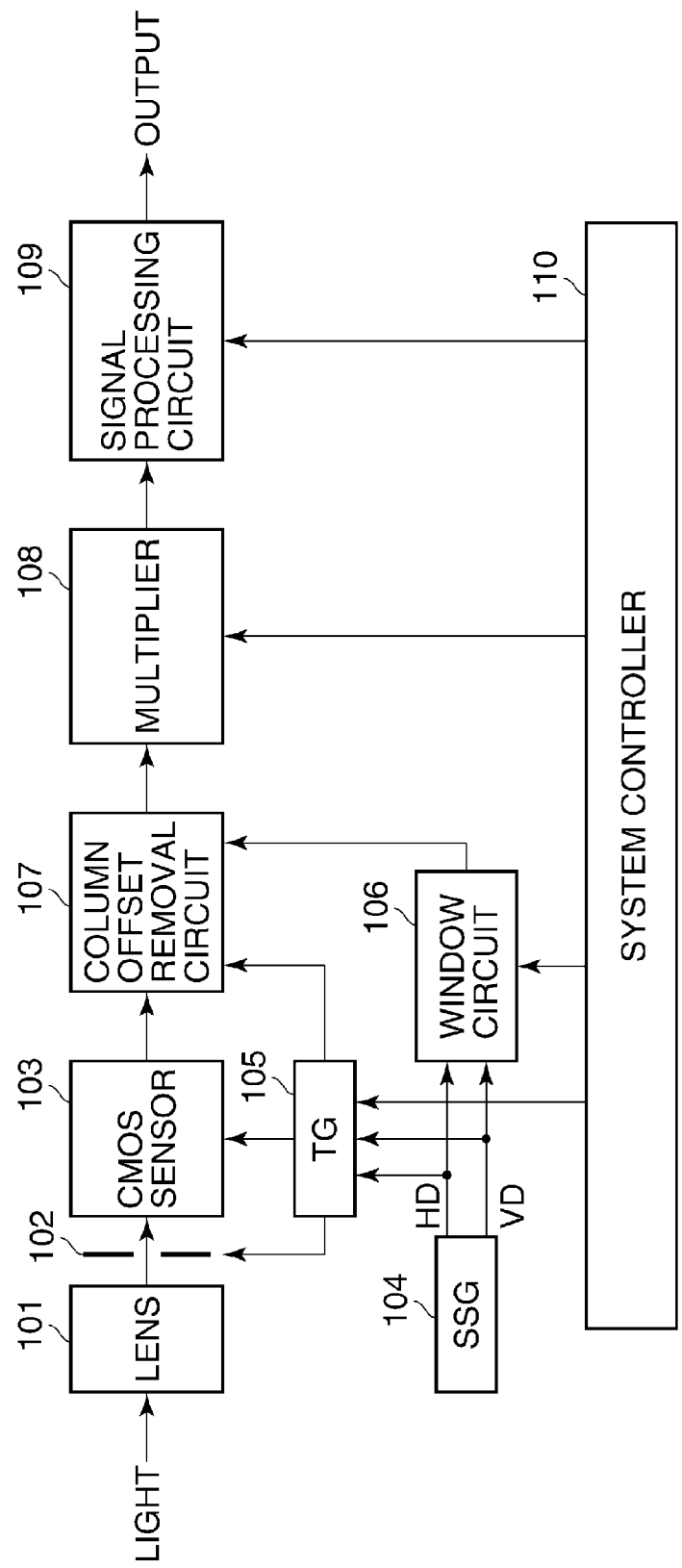
FIG. 1 is a block diagram showing an image pickup apparatus according to a first embodiment of this invention.

FIG. 1 shows in block diagram an image pickup apparatus according to a first embodiment of this invention.

Referring to FIG. 1, the image pickup apparatus includes a CMOS image sensor (CMOS sensor) 103, which is a solid-state image pickup device. Light is incident into the CMOS sensor 103 through a lens 101 and a shutter aperture 102, and an optical image is formed on the CMOS sensor 103. The CMOS sensor 103 converts an optical signal corresponding to the optical image into an electrical signal and outputs the same.

Figure 2:
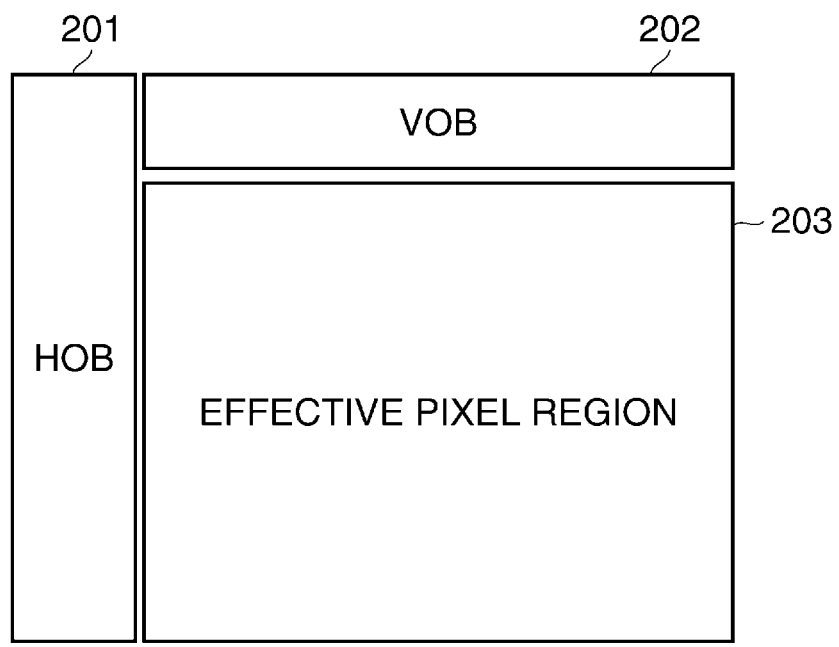
FIG. 2 is a view schematically showing a pixel arrangement of a CMOS sensor mounted to the image pickup apparatus.

FIG. 2 schematically shows a pixel arrangement of the CMOS sensor 103. As shown in FIG. 2, the CMOS sensor 103 includes an effective pixel region 203 in which photodiodes (not shown) as photoelectric conversion elements are irradiated with light, and includes a horizontal optical black region (hereinafter, referred to as the HOB region) 201 and a vertical optical black region (hereinafter, referred to as the VOB region) 202. In the HOB region 201, light irradiation is intercepted over several to several ten columns by, e.g., an aluminum thin film. In the VOB region 202, light irradiation is intercepted over several to several ten lines by, e.g., an aluminum thin film.

Referring to FIG. 1 again, the image pickup apparatus includes a sync signal generator (hereinafter, referred to as the SSG) 104, timing generator (hereinafter, referred to as the TG) 105, window circuit 106, column offset removal circuit 107, multiplier (multiplication unit) 108, signal processing circuit 109, and system controller 110. The TG 105, window circuit 106, multiplier 108, and signal processing circuit 109 operate under the control of the system controller 110.

The SSG 104 generates a horizontal sync signal and a vertical sync signal (hereinafter, respectively referred to as the HD signal and the VD signal), and supplies these signals to each of the TG 105 and the window circuit 106. In synchronism with the HD and VD signals, the TG 105 generates control signals for driving the CMOS sensor 103 and the shutter aperture 102. In synchronism with the HD and the VD signals and under the control of the system controller 110, the window circuit 106 generates a control signal for driving the column offset removal circuit 107.

The column offset removal circuit 107 detects a column offset component of image data output from the CMOS sensor 103, and subtracts (or removes) the column offset component from image data in an effective pixel region. The multiplier 108 having a variable multiplication coefficient is used to change an image pickup signal sensitivity (or image data sensitivity), i.e., a ratio of output to incident light amount. The signal processing circuit 109 performs interpolation processing, color conversion processing, etc. on image data. The signal processing circuit 109 also performs reduction/enlargement zooming process to covert image data into one that can be displayed on a display device, and converts the image data into, e.g., JPEG image data suitable for a recording device (not shown). As described later, the system controller 110 decides an operation mode and parameters for A/D converters (described later).

Next, a description will be given of operation of the image pickup apparatus.

Based on the HD and VD signals generated by the SSG 104, the TG 105 generates a control signal for driving the CMOS sensor 103. At a timing of the control signal being input from the TG 105, the CMOS sensor 103 converts an optical signal passing through the lens 101 and shutter aperture 102 into an electrical signal. Digital image signal (image data) read from the CMOS sensor 103 is supplied to the column offset removal circuit 107.

Figure 3:
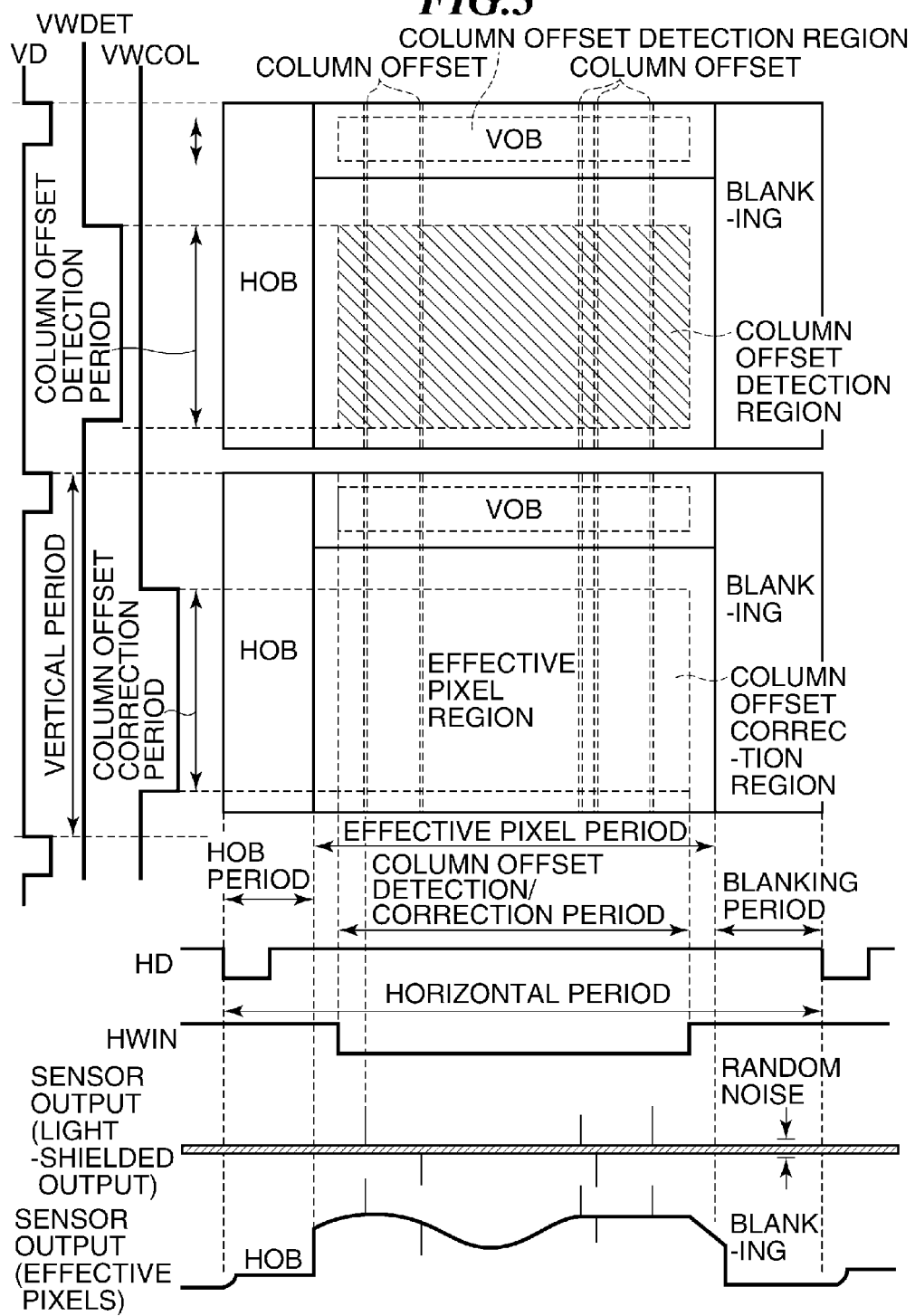
FIG. 3 is a view showing timing signals for use by the image pickup apparatus to perform column offset detection and correction at the time of still image photographing and showing sensor outputs which are output in synchronism with the timing signals.

FIG. 3 shows timing signals for use by the image pickup apparatus to perform column offset detection and correction at the time of still image photographing, and shows sensor outputs which are output in synchronism with the timing signals Referring to FIGS. 1 and 3, a column offset detection process at the time of still image photographing is described. In accordance with an instruction from the system controller 110, the TG 105 controls the shutter aperture 102 to close the shutter. In a state where the shutter is closed, light-shielded image data is read from the CMOS sensor 103.

While referring to the HD and VD signals, the window circuit 106 supplies the column offset removal circuit 107 with vertical and horizontal detection permission signals VWDET, HWIN that respectively instruct vertical and horizontal column offset detection periods in an effective pixel region light-shielded by the shutter. The column offset removal circuit 107 calculates column offset data according to the VWDET and HWIN.

Next, a column offset removal process at the time of still image photographing is described. In accordance with an instruction from the system controller 110, the TG 105 controls the shutter aperture 102 to open the shutter. Then, an object image is formed on the CMOS sensor 103 in a predetermined aperture state, and image data is read out from the CMOS sensor 103.

The window circuit 106 supplies the column offset removal circuit 107 with vertical and horizontal removal permission signals VWCOL, HWIN that respectively instruct vertical and horizontal column offset removal periods in the effective pixel region. The column offset removal circuit 107 subtracts, from an effective pixel signal (effective pixel data), column offset data calculated on a per column basis based on the image data in accordance with the VWCOL, thereby removing column offsets.

In the CMOS sensor 103 having an X-Y address type readout structure, so-called column offsets are likely to occur. The column offsets refer to offsets which are differently applied to respective columns at the time of readout due to differences in element characteristics variation between the columns. The column offsets are equally generated on pixels on an identical column which are common in routes of readout from the HOB region 201, VOB region 202, and effective pixel region 203 (which are shown in FIG. 2).

In the example shown in FIG. 3, the vertical column offset detection period is set to 960 lines, and column offset data is calculated by performing addition-averaging for the 960 lines. In addition to column offsets, random noise is superposed on the column offset detection lines. To suppress the random noise in order to extract column offset components with accuracy, it is preferable to secure a sufficient number of detection lines. Image data output from the column offset removal circuit 107 is supplied to the signal processing circuit 109 through the multiplier 108 which is a sensitive switching unit. Then, the image data is signal-processed in the signal processing circuit 109, whereby the image data is converted for output into image data suited to the display device and the recording device.

Figure 4:
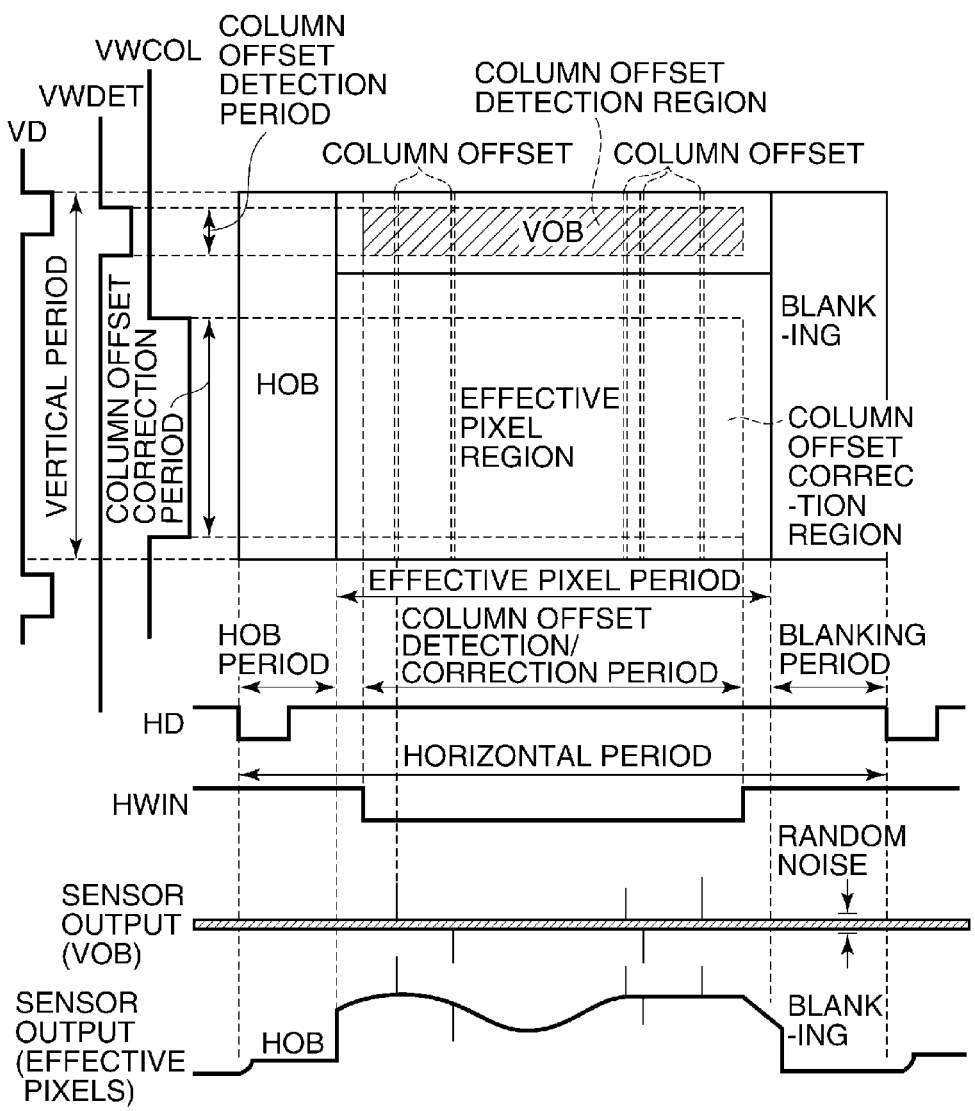
FIG. 4 is a view showing timing signals for use by the image pickup apparatus to perform column offset detection and correction at the time of moving image photographing and showing sensor outputs which are output in synchronism with the timing signals.

FIG. 4 shows timing signals for use by the image pickup apparatus to perform column offset detection and correction at the time of moving image photographing, and shows sensor outputs which are output in synchronism with the timing signals.

Referring to FIGS. 1 and 4, the column offset detection and removal at the time of moving image photographing are performed in the same readout frame (vertical period), unlike at the time of still image photographing. In accordance with an instruction from the system controller 110, the TG 105 controls the shutter aperture 102 to open the shutter. In a predetermined aperture state, an object image is formed on the CMOS sensor 103 and image data is read out from the sensor 103.

While referring to the HD and VD signals, the window circuit 106 supplies the column offset removal circuit 107 with vertical and horizontal detection permission signals VWDET, HWIN that respectively instruct vertical and horizontal column offset detection periods in the VOB region 202 (FIG. 2). The column offset removal circuit 107 calculates column offset data according to the VWDET and HWIN.

The window circuit 106 supplies the column offset removal circuit 107 with vertical and horizontal removal permission signals VWCOL, HWIN that respectively instruct vertical and horizontal column offset removal periods in the effective pixel region 203 (FIG. 2). The column offset removal circuit 107 subtracts, from the effective pixel signal, column offset data calculated on a per column basis based on the image data in accordance with the VWCOL, thereby removing the column offsets.

In the CMOS sensor 103, the column offsets are equally generated on pixels on an identical column which are common in readout routes from the HOB region 201, VOB region 202, and effective pixel region 203, as previously described. Thus, the column offset detection and removal are extremely effective for a moving image, as with a still image.

In the example shown in FIG. 4, the vertical column offset detection period is set to 40 lines, and column offset data is calculated by performing addition-averaging for the 40 lines. Also in the case of a moving image, random noise as well as column offsets are superposed on the column offset detection lines, as with a still image. To suppress the random noise to extract column offset components with accuracy, it is preferable to ensure a sufficient number of detection lines.

However, in the case of moving image photographing, since a readout time per frame increases with increase in the number of detection lines in the readout frame (vertical period), the frame rate of moving image decreases with the increasing number of detection lines. This makes it difficult to ensure a sufficient number of detection lines.

At the time of the moving image photographing, therefore, there is used a technique of obtaining column offset data from less numbers of detection lines and averaging plural pieces of column offset data for plural frames (i.e., using readout times of the plural frames), so as to improve the accuracy of column offset data. Image data output from the column offset removal circuit 107 is supplied through the multiplier 108 to the signal processing circuit 109 where the image data is signal-processed to be converted for output into image data suited to the display device and the recording device.

Figure 5:
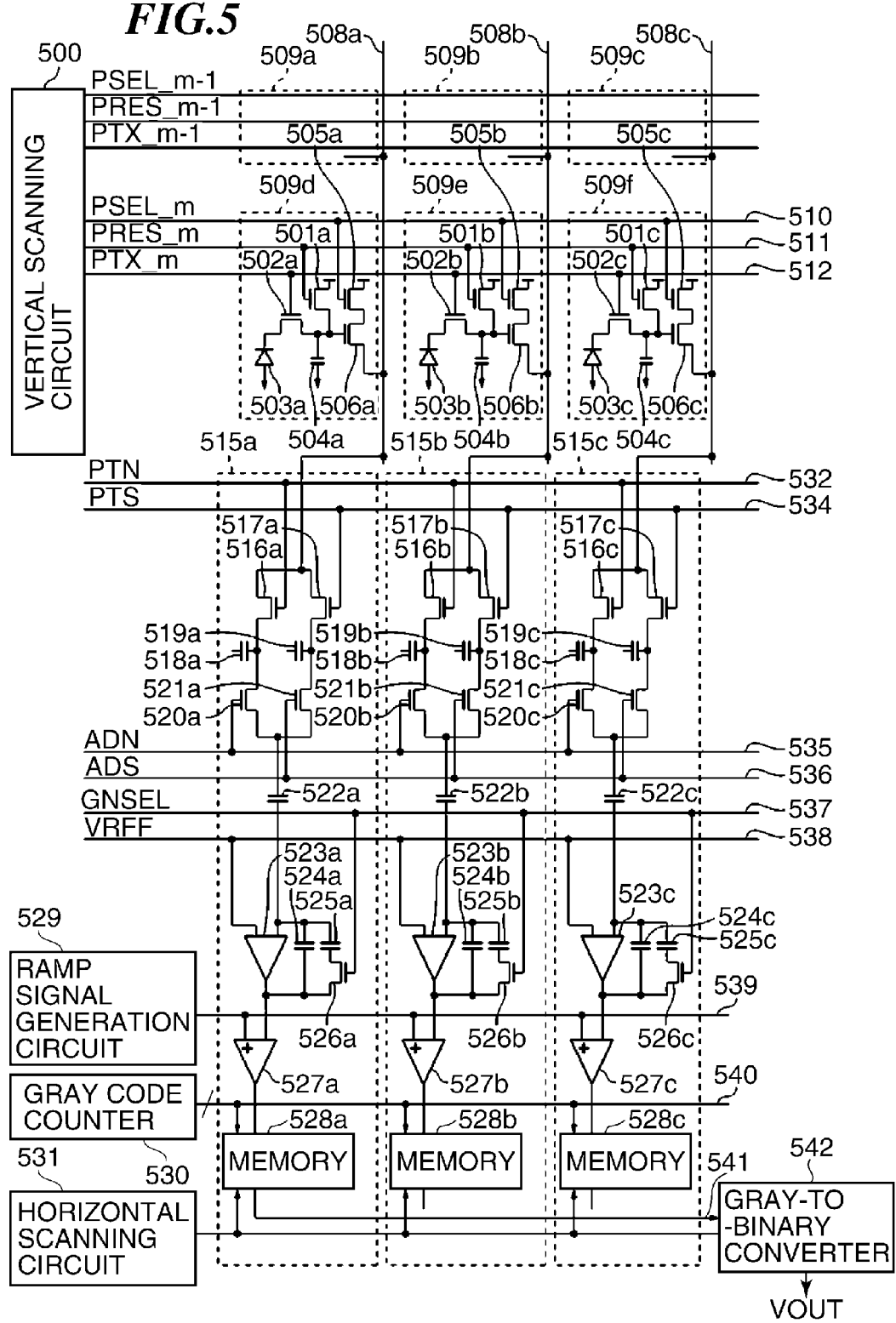
FIG. 5 is a circuit diagram showing the details of an example construction of the CMOS sensor.

Next, a description will be given of the construction and operation of the CMOS sensor 103. FIG. 5 shows in circuit diagram the details of an example construction of the CMOS sensor 103.

Referring to FIG. 5, the CMOS sensor 103 includes a vertical scanning circuit 500, ramp signal generation circuit 529, gray code counter 530, horizontal scanning circuit 531, and gray-to-binary converter 542.

As illustrated, the CMOS sensor 103 includes a plurality of pixels which are two-dimensionally arranged in a matrix. Although only the pixels 509a to 509f are shown in FIG. 5, the CMOS sensor 103 actually includes a large number of pixels. The pixels 509a to 509f are connected to the vertical scanning circuit 500 that sequentially selects pixels arranged in the row direction, as a readout row, from the pixels arranged in a matrix.

The pixels 509d to 509f include photodiodes (hereinafter, referred to as the PDs) 503a to 503c, respectively, which are photoelectric conversion elements. Reset transistors (hereinafter, referred to as the reset Trs) 501a to 501c are on-off controlled by the vertical scanning circuit 500, and operate to reset optical signal charges which are stored in the PDs 503a to 503c. Transfer transistors (hereinafter, referred to as the transfer Trs) 502a to 502c are on-off controlled by the vertical scanning circuit 500, and operate to transfer optical signal charges stored in the PDs 503a to 503c to floating diffusions (hereinafter, referred to as the FDs) 504a to 504c.

The FDs 504a to 504c convert the transferred optical signal charges into FD potentials and store them. Selection transistors (hereinafter, referred to as the selection Trs) 505a to 505c are on-off controlled by the vertical scanning circuit 500 as described later, and output the FD potentials to vertical output lines 508a to 508c through pixel source followers (hereinafter, referred to as the pixel SFs) 506a to 506c, which are buffer amplifiers.

The CMOS sensor 103 includes column readout circuits 515a to 515c, which are respectively connected to vertical output lines 508a to 508c.

The column readout circuits 515a to 515c respectively include switch transistors 516a to 516c and capacitors 518a to 518c. These transistors and capacitors constitute sample-hold circuits (hereinafter, each referred to as the S/H(S)) for storing S signals (signal charges), respectively. Selection Trs 520a to 520c are transistors each for selecting an S/H(S) signal.

The column readout circuits 515a to 515c further include switch transistors 517a to 517c and capacitors 519a to 519c, respectively, which constitute sample-hold circuits (hereinafter, each referred to as the S/H (N)) for storing N signals (noise charges). Selection Trs 521a to 521c are transistors each for selecting an S/H(N) signal.

The column readout circuits 515a to 515c respectively include column amplifiers 523a to 523c. Gains of these column amplifiers are respectively decided according to capacitance ratios between capacitors 522a to 522c, 524a to 524c, and 525a to 525c, and are respectively switched by switch transistors 526a to 526c.

Further, the column readout circuits 515a to 515c include comparators 527a to 527c and memories 528a to 528c for temporary data storage. Outputs from the column amplifiers 523a to 523c and output from the ramp signal generator 529 are respectively supplied to the comparators 527a to 527c. At switching timings of output signals from the comparators 527a to 527c, e.g., at timings of switching from low (L) level to high (H) level, an output code from the gray code counter 530 is latched into the memories 528a to 528c.

Lamp type A/D converters are constituted by the comparators 527a to 527c, memories 528a to 528c, ramp signal generator 529, and gray code counter 530, as described above. Reference numeral 538 denotes a reference voltage VREF that is used as a reference for signal amplification in the column amplifiers 523a to 523c. As illustrated, the ramp type A/D converters are disposed on the output side of the column amplifiers 523a to 523c.

In the illustrated example, the vertical scanning circuit 500 is connected to the pixels 509d to 509f of m-th row (where m is an integer equal to 2 or greater) through a row selection line of m-th row (hereinafter, referred to as the PSEL_m) 510, a reset signal line of m-th row (hereinafter, referred to as the PRES_m) 511, and a signal transfer line of m-th row (hereinafter, referred to as the PTX_m) 512.

The vertical scanning circuit 500 is also connected to the pixels 509a to 509c through a row selection line of (m−1)-th row (hereinafter, referred to as the PSEL_m−1), a reset signal line of (m−1)-th row (hereinafter, referred to as the PRES_m−1), and a signal transfer line of (m−1)-th row (hereinafter, referred to as the PTX_m−1).

Under the control of the system controller 110 shown in FIG. 1, a signal (hereinafter, referred to as the PTN) 532 by which a readout period is decided is supplied from the TG 105 (FIG. 1) to the S/H(N), and a signal (hereinafter, referred to as the PTS) 534 by which a readout period is decided is supplied to the S/H(S). The TG 105 outputs a signal (hereinafter, referred to as the ADN) 535 by which the S/H(N) is selected and the readout period for the comparators 527a to 527c is decided, and outputs a signal (hereinafter, referred to as the ADS) 536 by which the S/H(S) is selected and the readout period for the comparators 527a to 527c is decided.

The horizontal scanning circuit 531 selects a readout column according to outputs from the memories 528a to 528c of respective columns. The gray-to-binary converter 542 is a code conversion unit for converting gray code to binary code. Specifically, the outputs of the memories 528a to 528c are sequentially selected by the horizontal scanning circuit 531 and read to a horizontal output line 541, and are each output as an image pickup signal (VOUT) through the gray-to-binary converter 542.

Figure 6:
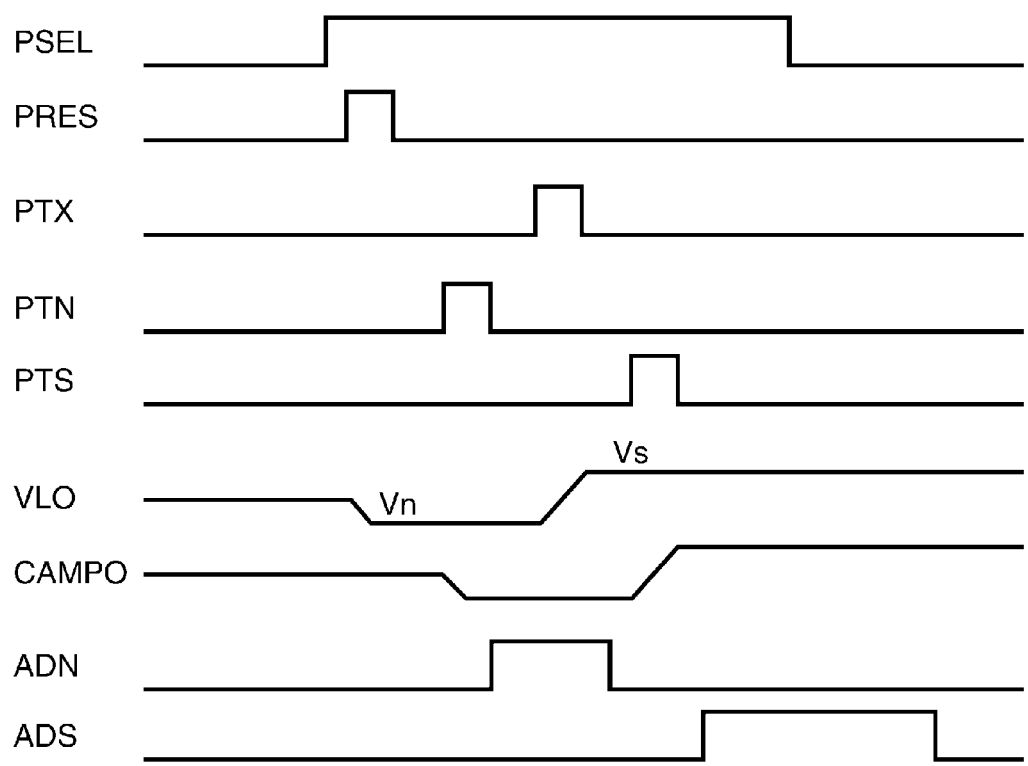
FIG. 6 is a timing chart showing an operation of the CMOS sensor.

FIG. 6 shows in timing chart the operation of the CMOS sensor 103 shown in FIG. 5. In FIG. 6, suffixes of respective signals are omitted.

In the following, a description will be given of operation of the pixel 509d with reference to FIGS. 5 and 6. The other pixels 509a to 509c, 509e, and 509f operate in the same manner as the pixel 509. Upon start of a photographing operation, light is incident into the PD 503a, and optical signal charges are generated on the PD 503a. The FD 504a starts accumulation of optical signal charges, and the vertical scanning circuit 500 sequentially scans respective rows.

When the scan reaches the m-th row, the PSEL_m 511 becomes a H level. Then, the PRES_m 512 becomes a H level, so that the FD 504a is reset. Then, a level signal VLO from the FD 504a (hereinafter, referred to as the reset level signal Vn), which includes reset noise, is read out onto the vertical output lines 508 through the pixel SF 506. The reset level signal Vn is stored as an N signal into the S/H (N) during a H-level period of the PTN m 532 (hereinafter, referred to as the N read time).

Subsequently, the PTX_m 512 becomes a H-level, and charges generated on the PD 503a are read out onto the FD 504a. Then, a level signal Vs from the FD 504a is read out onto the vertical output lines 508 through the pixel SF 506. The level signal Vs is stored as an S signal into the S/H(S) during a H-level period of the PTS_m (hereinafter, referred to as the S read period).

The N signal stored in the S/H(N) is read out by the column amplifier 523a during a H-level period of the ADN 535 (hereinafter, referred to as the N-AD period). The S signal stored in the S/H(S) is read out by the column amplifier 523a during a H-level period of the ADS 536 (hereinafter, referred to as the S-AD period).

The column amplifier 523a amplifies and outputs a difference between the N signal and the reference voltage VREF 538 or between the S signal and the VREF 538. The gain of the column amplifier 523a is determined by a load capacitance value of either the capacitor 524a or 525a selected according to on or off of the GNSEL 537, and can be switched and set in two stages.

By adding a gain switching circuit for switching the gain of the column amplifier 523a, the number of gain switching steps can be increased. However, the addition of gain switching circuit components such as transistors and capacitors (especially, the addition of capacitors) increases the chip size of the CMOS sensor and lowers the through rate in column amplifier operation. With the current semiconductor process technology, it is appropriate to set the number of gain switching steps to a value from 1 to 8, e.g., 4.

In the N-AD period, the comparator 527a compares the N signal amplified by and output from the column amplifier 523a with a ramp signal supplied from the ramp signal generator 529. The N signal corresponds to a CAMPO signal shown in FIG. 6.

In synchronism with when the gray code counter 530 becomes zero, the ramp signal generation circuit 529 starts to gradually change a voltage of the ramp signal from an initial voltage value. When the ramp signal reaches the same voltage level as the N signal, the output of the comparator 527a changes from an L level to an H level. In this timing, the output value of the gray code counter 530 is latched and stored, as a digital code corresponding to the N signal, into the memory 528a.

In the S-AD period, the comparator 527a compares the S signal amplified by and output from the column amplifier 523a with the ramp signal supplied from the ramp signal generator 529. The S signal corresponds to the CAMPO signal shown in FIG. 6.

The ramp signal generation circuit 529 again starts to change the ramp signal voltage from the initial voltage value in synchronism with when the gray code counter 530 becomes zero. When the ramp signal reaches the same voltage level as the S signal, the output of the comparator 527a changes from the L level to the H level. In this timing, the output value of the gray code counter is latched and stored, as a digital code corresponding to the S signal, into the memory 528a.

Next, differences between N signals and S signals are each calculated by subtracting the N signal from the S signal, thereby obtaining S-N signals. S-N signals of the m-th row are sequentially read out, on a per column basis, onto the horizontal output line 541 by the horizontal scanning circuit 531, and supplied to the gray-to-binary converter 542. The converter 542 performs code conversion from gray code to binary code on each S-N signal and outputs the converted S-N signal in digital form, as a sensor output VOUT of the CMOS sensor 103.

The S signal is equivalent to the sum of the N signal and a signal which is based on optical signal charges generated in the PD 503a. By performing a differential operation on the S and N signals, a CDS operation is performed, whereby reset noise and 1/f noise which are caused in the CMOS sensor (image pickup device) are removed from the sensor output VOUT of the CMOS sensor 103. Then, an image pickup signal (image data) is output in a state superposed with column offsets caused by characteristic differences between column circuits.

Next, with regard to the operation of the ramp type A/D converter constituted by the comparator 527a, memory 528a, ramp signal generator 529, and gray code counter 530, which are shown in FIG. 5, a description will be given of a relation between conversion time and the number of bits for full scale range.

The ramp type A/D converter is characterized in that it has plural operation modes and is capable of variably changing the full scale range. More specifically, the ramp type A/D converter at least comprises first and second operation modes. In the first operation mode, the A/D converter operates with a first number of conversion bits and at a first conversion speed. In the second operation mode, the A/D converter operates with a second number of conversion bits less than the first number of conversion bits and at a second conversion speed faster than the first conversion speed.

FIG. 7 shows an example of operation of the ramp type A/D converter. In FIG. 7, an output value of the gray code counter 530 is taken along the abscissa, and voltage levels of the ramp signal and image pickup signal, which are input to the comparator 527a, are taken along the ordinate.

The number of gradation bits for the full scale range is 10 bits ($2^{10}$) in operation mode 1, is 11 bits ($2^{11}$) in operation mode 2, and is 12 bits ($2^{12}$) in operation mode 3.

In the operation modes 1 to 3, the slope of the ramp signal changes interlockingly with the full scale range such that the full level VF of the ramp signal is always kept at a constant value. A time period required for the ramp signal voltage to change from the initial voltage value to a given image pickup signal level VS where the comparator output changes from L level to H level is different between the operation modes 1 to 3.

A time period required for A/D conversion (hereinafter, referred to as the A/D conversion time) is determined according to the number of counts and one count period. For example, assuming that the number of counts (i.e., the number of conversion bits) in the operation mode 1 is M and one count period is 10 nsec, the A/D conversion time in the operation mode 1 becomes 10 M nsec. In the operation mode 2 where the number of counts is twice as large as that in the operation mode 1, i.e., 2 M, the A/D conversion time becomes 20 M nsec. In the operation mode 3 where the number of counts is four times as large as that in the operation mode 1, i.e., 4 M, the A/D conversion time becomes 40 M nsec. The number of counts, M, and the A/D conversion time each rise to the maximum when the given image pickup signal level VS (ramp signal voltage) is at the full level VF. In the operation mode 1, the maximum number of counts is $2^{10}$ and the maximum A/D conversion time is about 10 µsec. In the operation mode 2, the maximum number of counts is $2^{11}$ and the maximum A/D conversion time is about 20 µsec. In the operation mode 3, the maximum number of counts is $2^{12}$ and the maximum A/D conversion time is about 40 µsec.

A/D conversion is performed in parallel for each column in one row period. The A/D conversion time per one frame of 1000 rows (960 effective rows and 40 VOB rows) is about 10 msec in the operation mode 1, about 20 msec in the operation mode 2, and about 40 msec in the operation mode 3.

The frame rate (the number of frames that can be read out per second) of moving images is defined by the reciprocal of the conversion time. Thus, the upper limit frame rate is calculated as 100 fps in the operation mode 1, 50 fps in the operation mode 2, and 25 fps in the operation mode 3.

As described above, the A/D conversion time in the ramp type A/D converter becomes twice longer each time the number of gradation bits for the full scale range increases by one bit. Therefore, to achieve the frame rate of 60 fps by using the ramp type A/D converter, the operation mode 1 must be selected. In that case, the number of gradation bits for A/D conversion is decided to be 10 (bits).

The number of gradation bits of pixel data can be expanded by performing signal processing on the pixel data at the subsequent stage of the A/D converter.

Figure 8A:
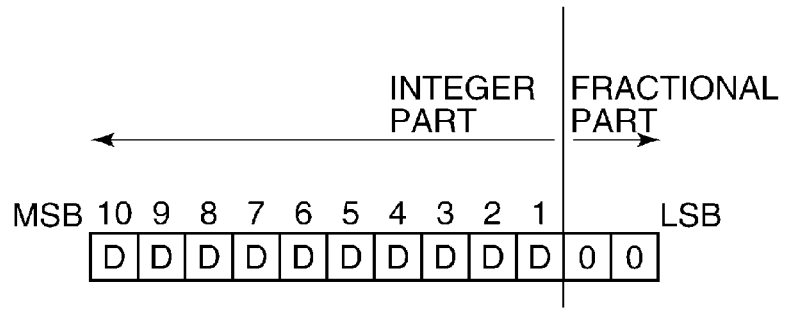
FIGS. 8A to 8C are views schematically showing a signal processing process performed by a signal processing circuit shown in FIG. 1, where
Figure 8B:
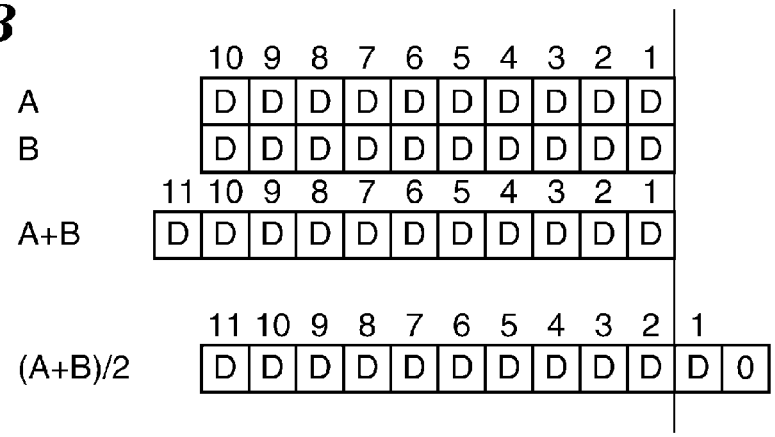
Figure 8C:
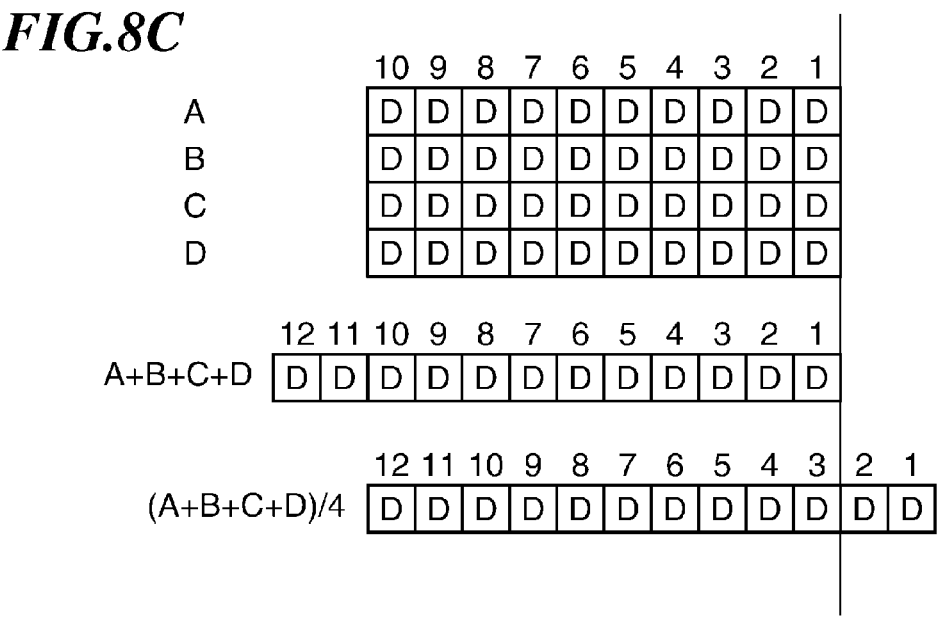

FIGS. 8A to 8C schematically show a signal processing process performed by the signal processing circuit 109 shown in FIG. 1. FIG. 8A shows a pixel data array of 12-bit length (in binary) having a 10-bit integer part and a 2-bit fractional part, FIG. 8B shows a process for 2-pixel interpolation where two pieces of pixel data A, B are added together and then divided by 2, and FIG. 8C shows a process for 4-pixel interpolation where four pieces of pixel data A to D are added together and then divided by 4.

The pixel data shown in FIG. 8A has the integer part constituted by 10-bit data output from the A/D converter in the operation mode 1 and the fractional part in which zeros are set, so that the effective number of gradation bits is 10 bits. As shown in FIG. 8B, the effective number of gradation bits is expanded by one bit to 11 bits by the 2-pixel interpolation where two pieces of pixel data A, B are added together and then divided by 2. As shown in FIG. 8C, the effective number of gradation bits is expanded by two bits to 12 bits by the 4-pixel interpolation where four pieces of pixel data A to D are added together and then divided by 4.

As described above, the number of gradation bits can be expanded by performing the addition/averaging process on plural pieces of pixel data to replace zeros in the fractional part of the pixel data with data obtained by the division. The number of bits by which the number of gradation bits is expanded can be increased by increasing the number of pieces of pixel data subjected to the addition/averaging process. Specifically, the number of gradation bits is expanded by N bits (N is a natural number) by performing the addition/averaging process on $2^N$ pieces of pixel data.

Next, a description will be given of an example of signal processing performed by the signal processing circuit 109 shown in FIG. 1 at the time of still image photographing.

Figure 9A:
FIG. 9A is a view showing an example pixel arrangement to be subjected to color interpolation processing by the signal processing circuit shown in FIG. 1 at the time of still image photographing.
Figure 9B:
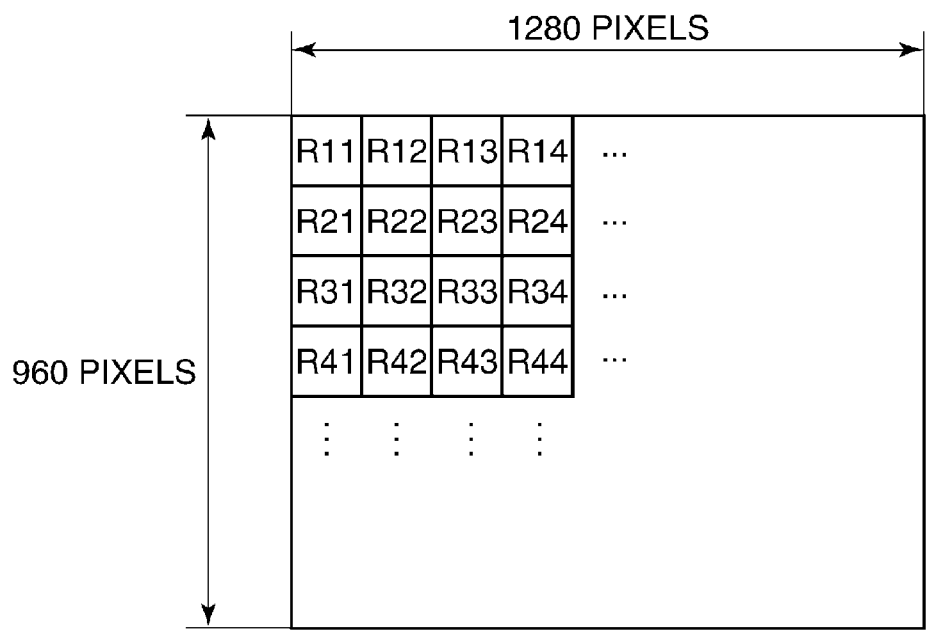
FIGS. 9B to 9D are views showing arrangements of red (R), green (G), and blue (B) color pixels after the color interpolation processing.
Figure 9C:
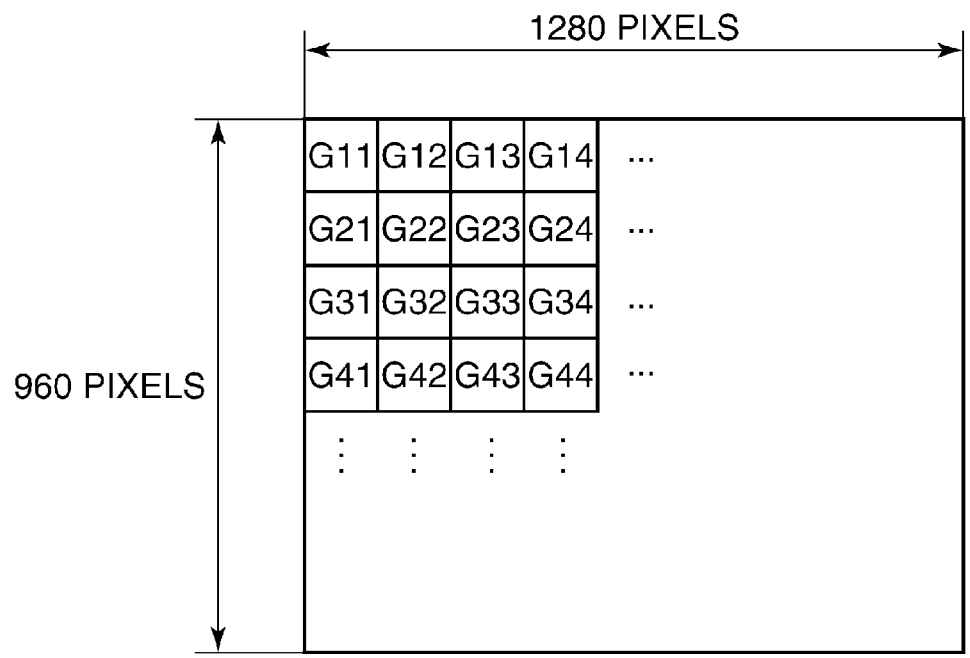
Figure 9D:
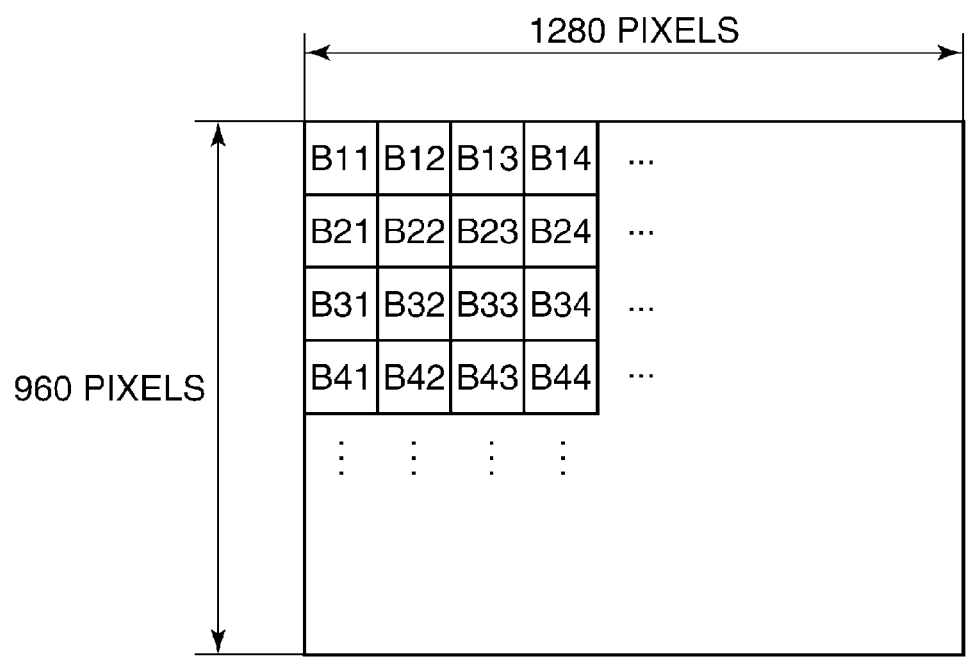

FIG. 9A shows an example pixel arrangement to be subjected to color interpolation processing by the signal processing circuit 109 shown in FIG. 1 at the time of still image photographing. FIGS. 9B to 9D show arrangements of red (R), green (G), and blue (B) color pixels after the color interpolation processing. FIGS. 9E to 9G show contents of arithmetic processing for respective pixel data and the number of gradation bits of pixel data expanded by the arithmetic processing.

In the CMOS sensor 103 shown in FIG. 5, a plurality of color filters are arranged in a predetermined array in the PDs 503a to 503c (which are light-receiving portions of photoelectric conversion elements). In this example, it is assumed that color filters for three colors, i.e., red (R), green (G), and blue (B) colors, are provided in the light-receiving portions.

In FIG. 9A, there is shown a repetitive arrangement (so-called Bayer arrangement) whose minimum unit is constituted by four pixels (2 vertical pixels and 2 vertical pixels) separated by the color filters for three colors. Pixel data for each of red (R), green (G), and blue (B) colors are located at spatially discrete positions. In other words, pixel data for one of R, G, B colors are missing at positions where pixel data for the other colors are located.

To generate a color image from pixel data of the Bayer arrangement shown in FIG. 9A, it is necessary to perform color interpolation processing in which missing pixel data are generated by interpolation using neighboring pixel data.

In FIGS. 9B to 9D, there are shown arrangements of red (R), green (G), and blue (B) color pixels after the color interpolation processing. With the color interpolation processing, pieces of pixel data each having the same size as the original image size are generated individually for red (R), green (G), and blue (B) colors. In FIGS. 9E to 9G, there are shown contents of arithmetic processing for respective pixel data including interpolation pixels shown in FIG. 9B and the number of gradation bits of pixel data expanded by the arithmetic processing. In the example shown in FIGS. 9E to 9G, pixel data are classified into pixel data that does not require interpolation (without bit expansion), pixel data that requires two-pixel interpolation (1-bit expansion), and pixel data that requires four-pixel interpolation (2-bit expansion).

The number of gradation bits of pixel data varies depending on the operation mode of the A/D converter. At the time of still image photographing, the A/D converter operates in the operation mode 3, and pixel data subjected to the interpolation has a gradation of 12 to 14 bits.

At the time of continuous still image photographing with a mechanical shutter, the operation speed is restricted by shutter control. It can be said that the readout speed of 25 fps in the operation mode 3 is a fast enough readout speed of the CMOS sensor 103.

FIG. 10 shows a gain switching table in which a relation is shown among ISO sensitivity (image pickup sensitivity), gains, and the number of gradation bits at the time of still image photographing.

At the time of still image photographing, column offset data is calculated by performing the addition-averaging for the 960 lines to remove column offsets, as previously described with reference to FIG. 3, each time a still image photographing operation is started. As a result, the readout speed in the CMOS sensor 103 is reduced by one-half to 12.5 fps, but no substantial trouble is caused in performing continuous photographing. At each photographing, the gains of the column amplifiers of the CMOS sensor 103 are switched in four steps (1-fold, 2-fold, 4-fold, and 8-fold), thereby setting the sensitivity in a range from ISO sensitivity of 100 to 800. In that sensitivity range, a gradation of 12 bits can be ensured at the minimum.

For a sensitivity range where the gains of column amplifiers exceed an upper limit value (over 8-fold), the multiplication coefficient in the multiplier 108 (FIG. 1) is changed in a range from 2-fold to 8-fold, thereby setting a total gain in a range from 16-fold to 32-fold, whereby the ISO sensitivity from 1600 to 6400 can be realized.

In that case, however, each time the multiplier 108 doubles the gain, arithmetic processing is performed to make one bit shift to the high order direction. As a result, the number of gradation bits decreases one-bit by one-bit, so that quantum noise is doubled. It is empirically considered that a 9-bit gradation is a practical low limit although the low limit varies depending on random noise contained in pixel data.

Next, a description will be given of an example of signal processing performed by the signal processing circuit 109 at the time of moving image photographing. Also at the moving image photographing, processing is performed that is similar to the color interpolation processing already described with reference to FIGS. 9A to 9E.

At the time of moving image photographing, the A/D converters operate in the operation mode 1 in order to realize a moving image frame rate of 60 fps. Pixel data subjected to the interpolation has a gradation of 10 to 12 bits, which is lower by 2 bits than the gradation at the time of still image photographing. At the time of moving image photographing, it is necessary to perform size conversion to a moving image size after the color interpolation processing.

Figure 11A:
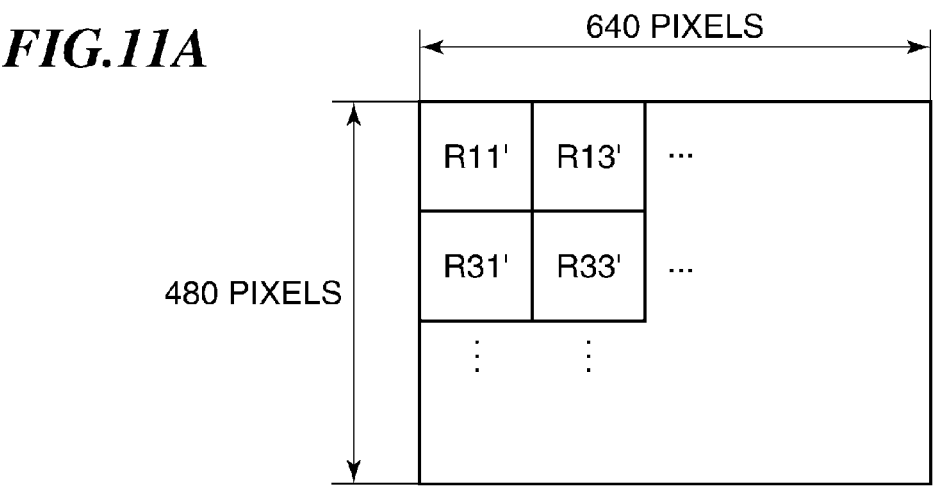
Figure 11B:
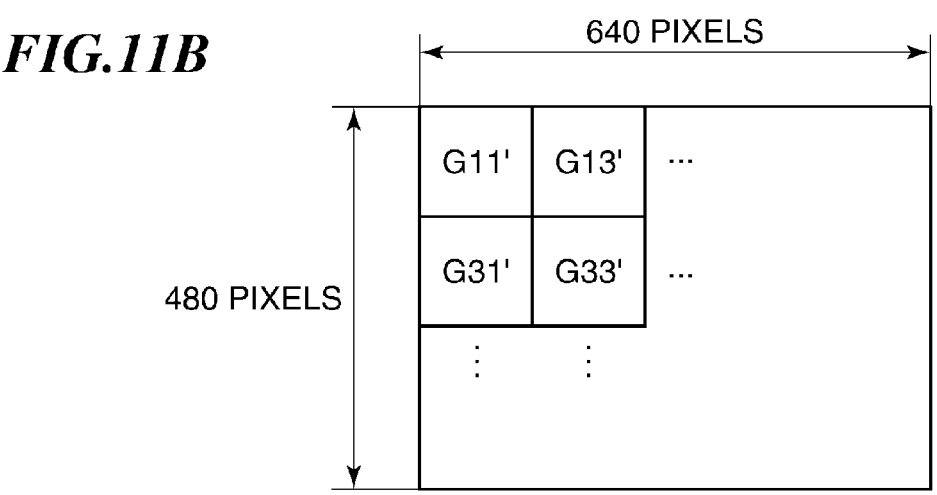
Figure 11C:
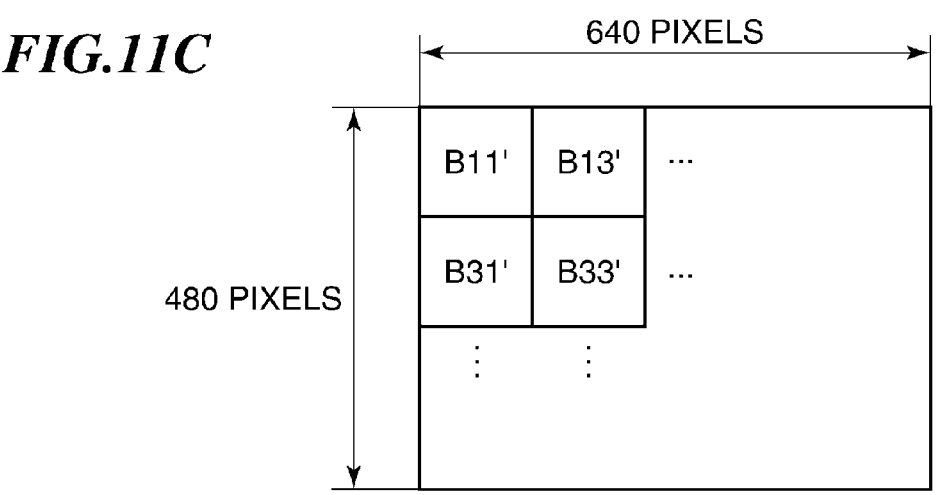

FIGS. 11A to 11F show a reduction zooming process performed by the signal processing circuit 109 in FIG. 1 for size conversion to a moving image size. FIGS. 11A to 11C show arrangements of red (R), green (G), and blue (B) color pixels after the reduction zooming, and FIGS. 11D to 11E show interpolation formulae for the reduction zooming.

With regard to image size specifications, it is assumed that the still image has a size of 1280 pixels wide by 960 pixels high (so-called SVGA size) and the moving image has a size of 640 pixels wide by 480 pixels high (so-called VGA size).

In the example shown in FIGS. 11A to 11C, a size conversion to reduce the width and height to one half is performed on the red (R), green (G), and blue (B) color pixels shown in FIGS. 9B to 9D after the color interpolation processing. In the size conversion, four pixels (2 vertical pixels and 2 vertical pixels) are subjected to the addition/averaging processing to generate one-pixel data.

In general, at the time of moving image photographing, the frame rate is improved by causing the CMOS sensor to perform pixel addition and thinning to thereby reduce the number of pieces of pixel data to be read out. In this embodiment, as with the still image photographing, color interpolation processing is performed also at the time of moving image photographing after the moving image is read out, without performing the pixel addition and thinning. Then, image size conversion (array size conversion) is performed on separated images for respective colors to eliminate a shift of the center of gravity, whereby a moving image of high-resolution quality containing abundant information can be obtained.

The number of gradation bits can be expanded by two bits by using the 4-pixel interpolation previously described with reference to FIG. 8C, whereby the moving image can have a gradation of 12 bits to 14 bits, which is the same as that of the still image.

FIG. 12 shows a gain switching table in which a relation is shown among ISO sensitivity (image pickup sensitivity), gains, and the number of gradation bits at the time of moving image photographing.

In a case that column offsets are detected from column offset data of 960 lines of a moving image as with the case of a still image, the readout speed of the CMOS sensor is reduced by one-half to 50 fps, thus making it impossible to realize a moving image frame rate of 60 fps.

As previously described with reference to FIG. 4, at the time of the moving image photographing, column offset data is obtained from a less number of detection lines and plural pieces of column offset data for plural frames are averaged in order to remove column offsets. In other words, the accuracy of column offsets is improved by using readout times of the plural frames.

If, during the moving image photographing, the set gain of column amplifier is switched as with the case of still image photographing to thereby switch the ISO sensitivity, a column offset level fluctuates depending on the column amplifier gain, and the accuracy of column offset correction is therefore temporarily deteriorated. As a result, a problem is posed that the image is disordered and vertical streaks appear in the image. To obviate this, the ISO sensitivity switching during the moving image photographing is performed by only switching the multiplication coefficient in the multiplier 108, while maintaining the set gain of the column amplifier, unlike the case of still image photographing.

As shown in FIG. 1, the multiplier 108 is disposed at the subsequent stage of the column offset removal circuit 107, whereby the gain switching is performed on image data from which column offsets have been removed. Thus, a problem of a reduction in the accuracy of column offset correction due to the sensitivity switching is not caused. However, as with the still image, arithmetic processing to make one bit shift to the high order direction is performed each time the gain of the multiplier 108 is doubled. As a result, the number of gradation bits decreases one-bit by one-bit, and quantum noise is doubled.

The multiplication coefficient in the multiplier 108 is switched to be variably changed from 1-fold to 8-fold, while the set gain of the column amplifier being fixed at 1-fold, thereby setting the total gain in a range from 1-fold to 8-hold, so that the ISO sensitivity of 100 to 800 can be realized.

Second Embodiment

A high-speed A/D conversion is highly necessary not only at the time of moving image photographing, but also at the time of strobe photographing in which a flash (strobe) light emission unit (not shown) is used in combination. In a second embodiment of this invention, light measurement data used for adjusting an amount of flash (strobe) light emission is obtained with accuracy from image data obtained by high-speed A/D conversion.

In the following, a description will be given of an example of signal processing performed by the signal processing circuit 109 at the time of strobe light measurement. The following is a description of a case where a so-called rolling electronic shutter is used in the CMOS sensor.

Figure 13A:
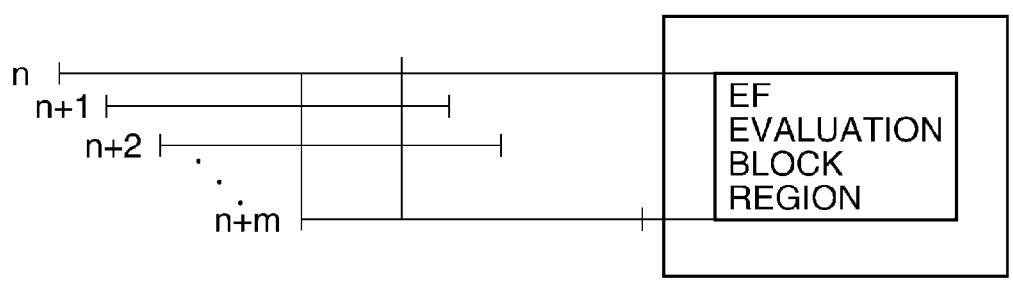
FIGS. 13A and 13B are views showing a relation between reading out of a sensor output from the CMOS sensor and strobe light measurement, where
Figure 13B:

FIGS. 13A and 13B show a relation between reading out of a sensor output from the CMOS sensor and EF (strobe light measurement), where FIG. 13A shows example timings of accumulation of optical charges generated by preliminary flash (strobe) light emission onto an EF evaluation block region, and FIG. 13B shows a change in light intensity with lapse of time.

Usually, preliminary flash (strobe) light emission is performed prior to execution of strobe photographing, and an amount of flash (strobe) light emission required for the strobe photographing is decided according to a sensor output obtained from the CMOS sensor at that time. In other words, a so-called EF (strobe light measurement) operation is carried out.

Optical charges received by the CMOS sensor 103 are accumulated on respective lines in sequence. The optical charge accumulations on the respective lines are started with a time shift, which corresponds to a predetermined readout time. As shown in FIG. 13B, the strength of light emitted by preliminary strobe emission in the EF operation changes with lapse of time along a time axis (abscissa). After completion of the optical charge accumulations, an evaluation is performed on an EF evaluation block region extracted from the entire area. To this end, it is necessary that the optical charge accumulations onto all of lines n to n+m (m is an integer equal to 2 or greater) corresponding to the EF evaluation block region be completed within a preliminary light emission period. In other words, if light generated by the preliminary light emission is not received at the entire EF evaluation block region, light measurement data cannot be detected with accuracy and the resultant detection accuracy is lowered.

In the example shown in FIG. 13A, light generated by the preliminary light emission is received at the entire EF evaluation block region.

Next, a description will be given of a case where light generated by the preliminary light emission is not irradiated to the entire EF evaluation block region, e.g., a case at the time of fill-in flash where a shutter speed is 1/500.

Figure 14A:
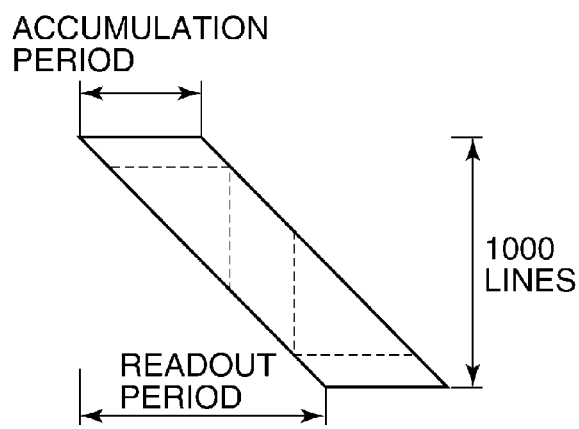
FIGS. 14A to 14D are views showing accumulation periods of optical charges onto the EF evaluation block region and changes in light strength with lapse of time, where
Figure 14C:
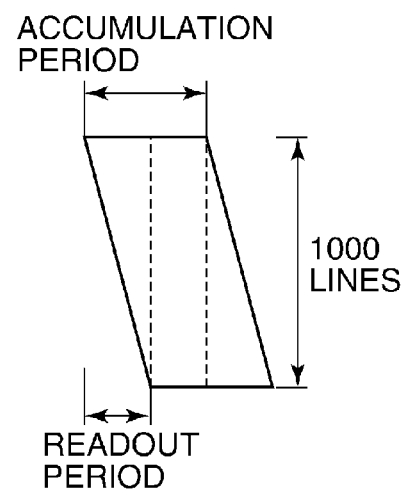
Figure 14B:
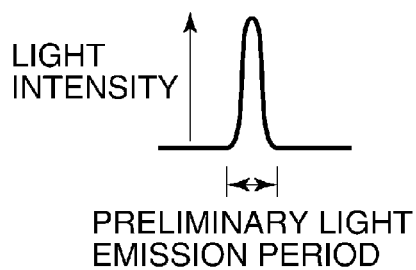
Figure 14D:
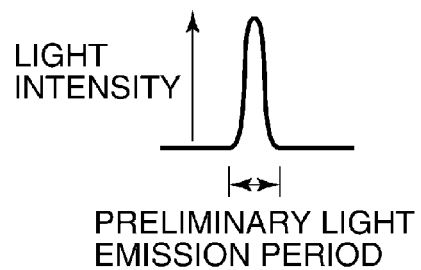

FIGS. 14A to 14D show accumulation periods of optical charges onto the EF evaluation block region and changes in light strength with lapse of time. FIGS. 14A and 14B show a case where an optical charge readout period in the CMOS sensor is longer than the accumulation period, and FIGS. 14C and 14D show a case where the optical charge readout period is shorter than the accumulation period.

At the time of fill-in flash where the shutter speed is 1/500, optical charges are accumulated onto the EF evaluation block region in an accumulation period of 2 msec. In that case, even if the A/D converter is operated in the operation mode 1 such that a time period required for optical charges of one line to be readout and the number of vertical lines are made identical with those at the time of moving image photographing, a time difference of about 10 msec is produced between time points at which charges are read out from the first line and from the last line.

As apparent from FIG. 14A, if the readout period is longer than the accumulation period, there are no readout periods overlapping one another through the entire lines of the EF evaluation block region. In the above case where the accumulation period is shorter than the readout period (corresponding to a time difference between a time point where charges (data) are read out from the first line of the entire 1000 lines and a time point where charges (data) are read out from the last line thereof), it is impossible to irradiate light generated by the preliminary light emission onto the entire EF evaluation block region.

In other words, light generated by the preliminary light emission can be irradiated onto the entire EF evaluation block region, only if the following formula (1) is satisfied by sync shutter speed, readout period, and preliminary light emission period.

Sync shutter speed≥Readout period+Preliminary light emission period    (1)

To satisfy formula (1), it is useful to shorten the readout period (i.e., to realize high-speed A/D conversion). By shorting the readout period, the inclination of a parallelogram shown in FIG. 14A can be changed.

By shortening the readout time period (e.g., 40 msec) shown in FIG. 14A to one eighth (e.g., 5 msec) as shown in FIG. 14C, it is possible to satisfy formula (1). To that end, in this embodiment, an operation mode 4 in which the A/D conversion speed is eight times higher than that in the operation mode 1 is newly provided. In that case, the number of gradation bits for covering the full scale range in the operation mode 4 must be set to 7 bits less than that (10 bits) in the operation mode 1 by 3 bits, as is apparent from the relation between operation mode and number of gradation bits previously described with reference to FIG. 7.

During the EF operation, pieces of pixel data are read out in the operation mode 4, and plural pieces of pixel data in the EF evaluation block shown in FIG. 13A are subjected to an addition/averaging process, thereby calculating an EF evaluation value. Based on the calculated EF evaluation value, an amount of flash (strobe) light emission at the time of photographing is decided. The pieces of pixel data read out in the operation mode 4 have a gradation of 7 bits, which is extremely rough, and are in a state where quantum noise is large. However, as previously described with reference to FIGS. 8A to 8C, the number of gradation bits can be expanded by performing the addition/averaging process on plural pieces of pixel data.

More specifically, the EF evaluation block region is divided into small block regions (each i pixels wide and j pixels high) each constituted by not less than 64 pixels, block evaluation values $W_{ij}$ for respective small block regions are calculated, and a sum of values, which are obtained by multiplying the block evaluation values $W_{ij}$ by predetermined weighting coefficients $K_{ij}$, is calculated. By this integration process, an evaluation value for the entire EF evaluation block region is calculated.

As described above, by using pixel data of 64 pixels ($2^6$ pixels), the number of gradation bits of the pixel data can be expanded by 6 bits. As a result, an EF evaluation value having a sufficient gradation of 13 bits can be obtained, thereby eliminating the problem that the gradation of pixel data read out in the operation mode 4 is rough. In addition, random noise can be reduced.

As apparent from the foregoing description, the signal processing circuit 109 and the system controller 110, which are shown in FIG. 1, function as an expansion processing unit (defined in the appended claims (ditto for other units mentioned below)), the TG 105 and the system controller 110 function as a first sensitivity switching unit, the system controller 110 functions as a second sensitivity switching unit, the signal processing circuit 109 and the system controller 110 function as a processing unit, and the system controller 110 function as a generation unit.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-147605, filed Jun. 29, 2010, which is hereby incorporated by reference herein in its entirety.

What is claimed is:
1. An image pickup apparatus comprising:
   pixels two-dimensionally arranged and each having a photoelectric conversion element;
   column amplifiers for respective columns of said pixels;
   A/D converters disposed on output sides of said column amplifiers and having a first operation mode in which said A/D converters operate with a first number of conversion bits and at a first conversion speed and a second operation mode in which said A/D converters operate with a second number of conversion bits less than the first number of conversion bits and at a second conversion speed faster than the first conversion speed; and
   an expansion processing unit configured to add together plural pieces of two-dimensionally arranged pixel data which are output from said A/D converters that operate in the second operation mode, to thereby expand a number of gradation bits of the pixel data from the second number of conversion bits.

2. The image pickup apparatus according to claim 1, further including:
 a first sensitivity switching unit configured to switch an image pickup sensitivity according to gains of said column amplifiers in a case where said A/D converters operate in the first operation mode.

3. The image pickup apparatus according to claim 1, including:
 a multiplication unit disposed at a subsequent stage of said A/D converters and having a variable multiplication coefficient; and
 a second sensitivity switching unit configured to switch the multiplication coefficient to thereby switch an image pickup sensitivity in a case where said A/D converters operate in the second operation mode.

4. The image pickup apparatus according to claim 1, including:
 a processing unit configured to perform a reduction zooming process on the two-dimensionally arranged image data output from said A/D converters that operate in the second operation mode, to thereby generate image data having an array size smaller than an original array size.

5. The image pickup apparatus according to claim 1, wherein the photoelectric conversion elements each have a light-receiving portion in which color filters for respective colors are arranged in a predetermined array, and
 the image pickup apparatus includes a processing unit configured to separate pieces of image data each corresponding to a color filter of a same color from the two-dimensionally arranged image data output from said A/D converters that operate in the second operation mode, perform interpolation processing on the separated image data, and perform a reduction zooming process on the interpolation-processed image data, thereby generating image data having an array size smaller than an original array size.

6. The image pickup apparatus according to claim 1, further including:
 a generation unit configured to perform an integration process on the two-dimensionally arranged image data output from said A/D converters that operate in the second operation mode to thereby generate light measurement data used for adjustment of an amount of strobe light emission at strobe photographing.

7. A control method for an image pickup apparatus including pixels two-dimensionally arranged and each having a photoelectric conversion element, column amplifiers for respective columns of the pixels, and A/D converters disposed on output sides of the column amplifiers, comprising the steps of:
 operating the A/D converters in a first operation mode in which the A/D converters operate with a first number of conversion bits and at a first conversion speed or in a second operation mode in which the A/D converters operate with a second number of conversion bits less than the first number of conversion bits and at a second conversion speed faster than the first conversion speed; and
 adding together plural pieces of two-dimensionally arranged pixel data which are output from the A/D converters that operate in the second operation mode, to thereby expand a number of gradation bits of the pixel data from the second number of conversion bits.

8. An image pickup apparatus comprising:
 an image sensor which includes pixels two-dimensionally arranged and each having a photoelectric conversion element, and A/D converters configured to output pixel data, the A/D converters having a first operation mode in which the A/D converters operate with a first number of conversion bits and at a first conversion speed and a second operation mode in which the A/D converters operate with a second number of conversion bits less than the first number of conversion bits and at a second conversion speed faster than the first conversion speed; and
 an expansion processing unit configured to expand a number of bits of the pixel data from the second number of conversion bits.

9. The image pickup apparatus according to claim 8, wherein the A/D converters are arranged for respective columns of the pixels.

10. The image pickup apparatus according to claim 9, said image sensor further comprising:
 column amplifiers for respective columns of the pixels.

11. The image pickup apparatus according to claim 8, wherein said expansion processing unit adds together plural pieces of pixel data which are output from the A/D converters that operate in the second operation mode.

12. The image pickup apparatus according to claim 9, further comprising:
 a first sensitivity switching unit configured to switch an image pickup sensitivity according to gains of said column amplifiers in a case where the A/D converters operate in the first operation mode.

13. The image pickup apparatus according to claim 12, comprising:
 a multiplication unit disposed at a subsequent stage of the A/D converters and having a variable multiplication coefficient; and
 a second sensitivity switching unit configured to switch the multiplication coefficient to thereby switch an image pickup sensitivity in a case where the A/D converters operate in the second operation mode.

14. The image pickup apparatus according to claim 9, comprising:
 a processing unit configured to perform a reduction zooming process on the two-dimensionally arranged image data output from the A/D converters that operate in the second operation mode, to thereby generate image data having an array size smaller than an original array size.

15. A control method for an image pickup apparatus comprising an image sensor which includes pixels two-dimensionally arranged and each having a photoelectric conversion element, and A/D converters configured to output pixel data, comprising the steps of:
 operating the A/D converters in a first operation mode in which the A/D converters operate with a first number of conversion bits and at a first conversion speed or in a second operation mode in which the A/D converters operate with a second number of conversion bits less than the first number of conversion bits and at a second conversion speed faster than the first conversion speed; and
 expanding a number of bits of the pixel data from the second number of conversion bits.

* * * * *